Oct. 11, 1966      J. F. LUNDEBERG      3,277,724
METEOROID PARTICLE MEASURING DEVICE
Filed April 17, 1964      2 Sheets-Sheet 1

INVENTOR.
JOHN F. LUNDEBERG
BY
Erwin F. Adams
ATTORNEY

Oct. 11, 1966  J. F. LUNDEBERG  3,277,724
METEOROID PARTICLE MEASURING DEVICE
Filed April 17, 1964  2 Sheets-Sheet 2
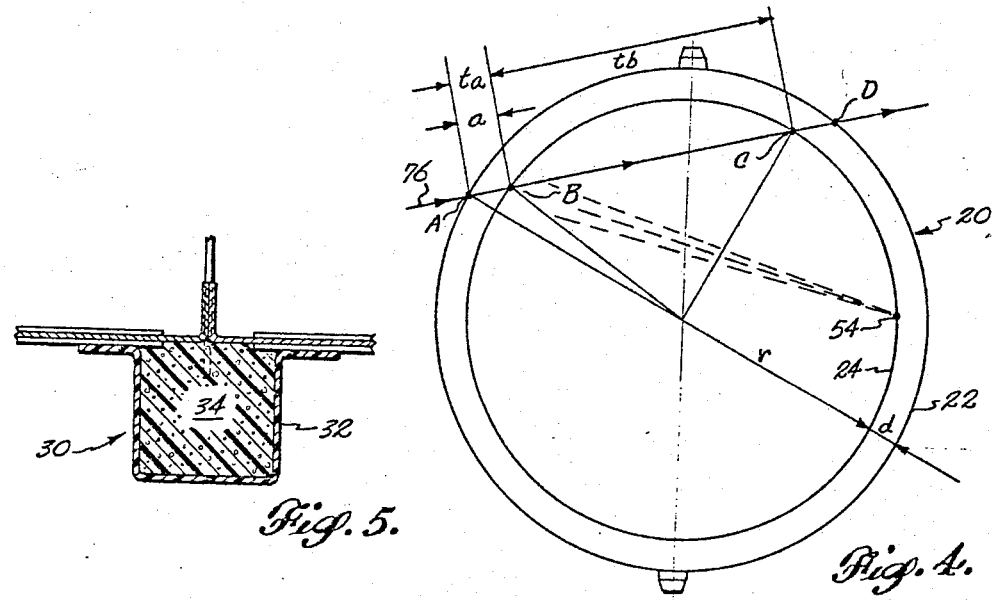
Fig. 5.
Fig. 4.
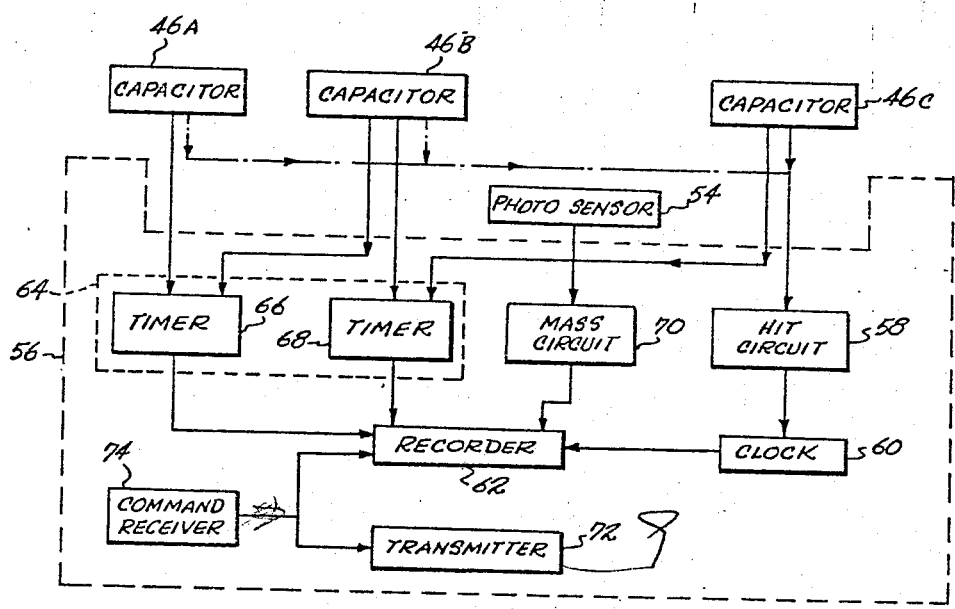
Fig. 6.
INVENTOR.
JOHN F. LUNDEBERG
BY
Erwin F. Adams
ATTORNEY United States Patent Office 3,277,724
Patented Oct. 11, 1966

3,277,724
METEOROID PARTICLE MEASURING DEVICE
John F. Lundeberg, Seattle, Wash., assignor to The Boeing Company, Seattle, Wash., a corporation of Delaware
Filed Apr. 17, 1964, Ser. No. 360,542
7 Claims. (Cl. 73—432)

This invention relates to a device for measuring meteoroid particles and more particularly to a device for independently measuring the mass and velocity of meteoroid particles colliding with the device.

Space vehicles to be used in space, especially those which are designed to carry men, will be subjected to various hazards such as the collision with meteoroids. Proper vehicle shielding against these hazards requires that the meteoroid space environment be well defined. Lack of data on this environment will require a conservative design philosophy which will impose a large weight penalty that will restrict mission capability and possibly prohibit desirable space programs. Present estimates of meteoroid environment rests on very little real data and much more extensively on interpretation and hypothesis. The methods of obtaining data presently used have been primarily: (1) visual, photographic and radar observation of meteors entering the earth atmosphere; (2) sounding rockets for particle collection; and (3) impact counters on near-earth satellites. Present satellite meteoroid measurements have been restricted to the measurement of particle momentum or energy which yields information as to particle mass only by assuming some average particle velocity. These methods for deriving present estimates of flux densities reasonably support flux estimates which differ by several orders of magnitude. Since an order of magnitude in flux environment affects the required structural thickness appreciably, on accurate estimate of the meteoroid environment is necessary for adequate but not overly conservative structural design.

It is an object of this invention, therefore, to provide a meteoroid particle measuring device that may independently measure the mass and velocity of particles which collide with the device.

According to the present invention, the foregoing object is attained by the provision of a device comprising two inflatable spherical structures one of which is concentrically mounted within the other, means for introducing an inflating medium into the structure to effect erection, means for detecting particle penetration of these structures mounted on each of the structures and means responsive to the particle penetration detection disposed within the particle measuring device.

For a better understanding of the invention together with other and further objects thereof reference should now be made to the following detailed description which is to be read in conjunction with the accompanying drawings in which:

FIGURE 4 is a diagrammatic drawing of the particle measuring device showing a particle penetration event;

FIGURE 5 is a sectional view of ring stiffeners used on the device; and

FIGURE 6 is a block diagram of one preferred embodiment of the device circuitry.

Figure 1:
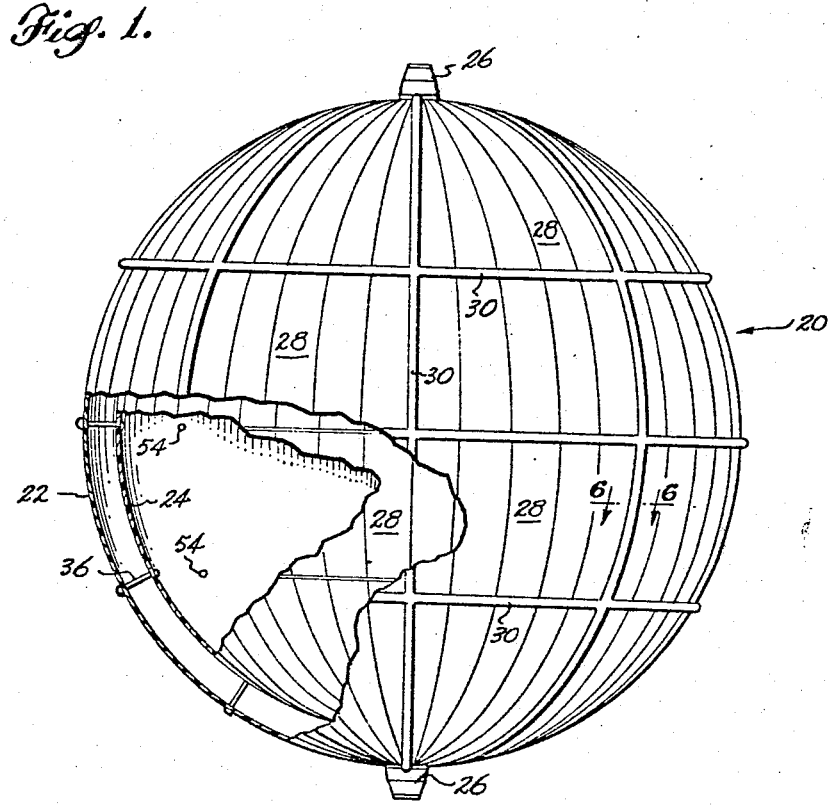
FIGURE 1 is a side elevation view of the meteoroid particle measuring device.

Referring now to FIGURE 1, a meteoroid particle measuring device 20 is shown comprising two inflatable spherical skin structures 22 and 24 and two instrument packages 26 located on the outer spherical structure 22 at points diametrically opposite each other. The instrument packages 26 provide a launch housing for the folded spheres, housing for the measuring device electronic equipment, support for solar cells which may be mounted on the packages and contains means for introducing an inflating medium into the spherical skin structures to effect erection of the structures.

Figure 2:
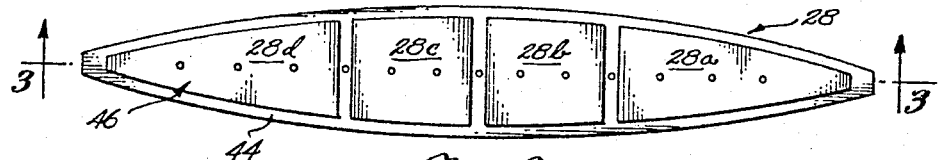
FIGURE 2 is a development view of a means for detecting particle penetration.
Figure 3:
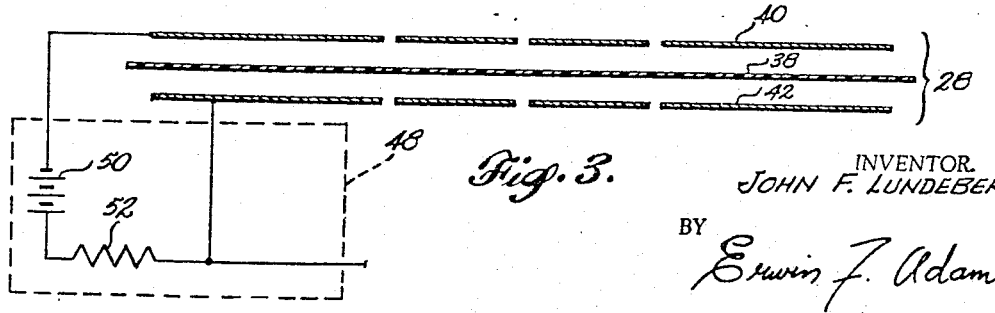
FIGURE 3 is a side elevation sectional view of the detection means shown in FIGURE 2.

Each of the spheres 22 and 24 are of the typical balloon gore construction with each gore 28 comprising laminated layers, as shown in FIGURES 2 and 3. The spheres assume structural rigidity upon introduction of a pressurized inflating medium. Further stiffening of the outer sphere will be provided by a plurality of ring stiffeners or ribs 30. The ribs 30 are U-shaped collapsible channels 32, as shown in FIGURE 5, attached to the sphere skin structure and may be filled with an ultraviolet-activated foam 34 that is formed after the measuring device has been inflated so as to stiffen the channels. Flexible material strips 36 are used as ties between the spheres 22 and 24. Adequate venting is supplied to the inner sphere 24 to prevent differential inflation medium pressures developing between the spheres.

Means for detecting meteoroid particle penetration of the spherical inflatable structures 22 and 24 are mounted on each of these structures. The means for measuring particle penetration may be acoustic, light or penetration sensors. The preferred embodiment of detecting means is the penetration sensor which may be of the pressure, wire-grid or capacitor type. The advantage of using the capacitor sensor as a mechanical-electrical transducer is due to the large sensor area provided which increases the probability of particle collision. One type of capacitor sensor utilizes the gores 28 as shown in FIGURES 2 and 3. Each gore is a laminate of a dielectric middle layer 38 such as Mylar, and two thin metallic layers 40 and 42 bonded to layer 38. The gore 28, which is one of the plurality of gores comprising each of the spheres 22 and 24, is divided into a plurality of electrically isolated sections 28a, 28b, 28c and 28d. These sections are formed by bonding metallic layer sections 40 and 42 to the dielectric layer 38 in a manner so as to leave strips 44 between adjoining metallic layers comprised only of the dielectric layer 38 which electrically insulates each section from one another so as to form a plurality of capacitors 46.

In operation, a capacitor 46 when penetrated by a meteoroid particle will be discharged which will cause an electrical pulse to be sent to equipment to be described later. The discharge of a capacitor 46 is produced by a short circuit path formed between the adjacent metallic lays 40 and 42. This short circuit path results from an ionization of the metallic layers which have been vaporized due to the high level of energy which is released by the particle colliding with the layer. The short circuit caused by the particle penetration, however, is quickly burned away thereby allowing the capacitor sensor to be recharged by circuit means 48 and used again. The non-destructibility feature of the capacitor sensor simplifies the analysis of data of the number of particle penetrations during the life of the measuring device. Sensitivities of capacitor sensors, moreover, can be controlled by varying the thickness of the exposed skin structure, i.e. metallic layer 40. Associated with the capacitor 46 is charging circuit means 48 which includes an electrical energy source, such as battery 50, coupled to one of the metallic layers 40 and an impedance, such as resistor 52, coupled to the other of the metallic layers 42.

The particle measuring device 20 has also disposed therein means for measuring the mass of particles comprising means 54 for measuring the light flash resulting from the impact of particles penetrating the second spherical skin structure 24. This impact flash measuring means includes a light sensor, such as a phototransistor, photoresistor or photo-multiplier tube, which would be located, for example, on the inner face of the sphere 24. It should be understood that the light sensors could be mounted in the center of the inner sphere or between the two spheres, so long as the sensors have a visibly unobstructed view of a portion of the inner sphere 24. The electrical pulse, initiated by the impact flash measuring device 54, is fed into means generally responsive to the particle penetration detection means 46 and the particle penetration flash measuring means 54. This electrical pulse varies with the amount of light flash produced by collision and may be pre-calibrated, by laboratory equipment, to indicate the particle mass.

The means responsive to the capacitor and light sensors comprises circuit means 56 shown diagrammatically in FIGURE 6. The circuit shows three capacitor sensors (capacitors with associated charging circuit means) 46A, 46B and 46C electrically connected to means for counting the electrical pulses produced by these capacitor transducers, such as hit circuit or counter 58. The capacitor sensors 46A, 46B and 46C represent three capacitors, one located on the outer sphere 22 and the other two located on inner sphere 24, respectively. The hit circuit 58 is electrically connected through clock 60 to recorder 62. The capacitor sensors are also electrically connected to velocity circuit 64 comprising timers 66 and 68 which are also electrically connected to recorder 62. One of the photo-sensors 54 is also shown electrically connected to recorder 62 through the mass circuit 70. A transmitter 72 and a command receiver 74 are connected to recorder 62.

FIGURE 4 is a drawing of a typical particle penetration event from which the measuring device 20 operation may be described. The particle path 76 indicates an initial penetration of the capacitor sensor 46A on the outer sphere 22 at point A. The penetration results in discharge of this capacitor causing an electrical pulse to be initiated in circuit means 56. The electrical pulse generated by penetration A triggers hit counter 58 and recorder 62. This pulse also triggers timer 66 which also pulses recorder 62. The particle then penetrates capacitor sensor 46B, located in particle path 76, on the inner sphere 24 at point B which discharges the capacitor and initiates a pulse to hit counter 58 and recorder 62. This second pulse is sent to velocity circuit 64 where timer 66 is turned off and timer 68 is initiated; the latter information being relayed to recorder 62. Penetration at point B also activates photosensor 54 and through mass circuit 70 the mass of the particle is recorded in recorder 62. A second penetration of inner sphere 24 at point C again initiates a pulse through discharge of the capacitor in capacitor sensor 46C located in particle path 76 which turns off timer 68 and relays this information to recorder 62. This latter penetration also sends a pulse to hit counter 58 and recorder 62 through clock 60. The particle then passes out from the outer sphere 22 at point D. Upon receiving a command signal from the ground in command receiver 74, transmitter 72 is activated to send the tape recorded information stored in recorder 62. The ground equipment may then calculate the velocity of the particle penetration using the times $t_b$ and $t_a$, between pulses measured by timers 66 and 68 and the physical dimensions of the measuring device 20, by means of the following formulas, wherein "d" is the distance between the spheres 22 and 24, and "r" is the radius of the inner sphere 24:

$$a = \sqrt{\frac{2dr + d^2}{t_b/t_a + 1}}$$

and, velocity $= a/t_a$.

In the preferred embodiment, circuit logic in circuit means 56 will prevent the recording of meaningless velocity data whenever the meteoroid particle does not penetrate at least three of the capacitors 46. This may be easily provided by coding the pulses initiated by the discharge of the capacitors 46 so that capacitor sensors 46A on the outer sphere initiate a single pulse and capacitor sensors 46B and 46C on the inner sphere a triple pulse. The recorder 62 will then record an event only when seven pulses are received from hit counter 58; any lesser number of hit pulses received will indicate an incomplete penetration and will be recorded independently so as to provide a flux rate for particles of smaller masses. An incomplete penetration stems from the fact that a particle which is too small in size will disintegrate upon collision with one of the capacitors 46 and thereby will be unable to discharge a further capacitor.

Various changes and modifications may be made in the embodiments described above without departing from the spirit and scope of the invention as defined by the hereinafter appended claims.

I claim:
1. A meteoroid particle measuring device comprising:
   (a) a first spherical inflatable structure;
   (b) a second spherical inflatable structure mounted concentrically within said first structure and spaced apart therefrom;
   (c) means for introducing an inflating medium into said first and second structures to effect erection;
   (d) means for detecting particle penetration of said first and second spherical structures mounted on each of said structures; and
   (e) timing means responsive to said particle penetration detecting means for determining time intervals of particles making successive penetrations of said spherical structures.

2. The meteoroid particle measuring device of claim 1 including means disposed within said second spherical structure for measuring the brightness of impact flash of particles penetrating said second spherical structure.

3. The meteoroid particle measuring device of claim 2 wherein the means for detecting particle penetration of the first and second spherical structures comprises a plurality of mechanical-electrical transducers, mounted on said first and second spherical structures, said transducers producing an electrical pulse upon impact of particles.

4. The meteoroid particle measuring device of claim 3 wherein said timing means comprises circuit means disposed in said device including:
   (a) means for counting and recording the electrical pulses produced by said transducers;
   (b) means for measuring the time elapsed between successive electrical pulses produced by said transducers; and
   (c) means for recording the time measured between sucessive electrical pulses produced by said transducers.

5. The meteoroid particle measuring device of claim 4 wherein the circuit means additionally includes means for measuring the mass of particles penetrating said second spherical inflatable structure responsive to said impact flash measuring means.

6. A meteoroid particle measuring device comprising:
   (a) a first spherical inflatable skin structure including a dielectric material layer and flexible metallic material layers bonded to each surface of said dielectric material layer;
   (b) a second spherical inflatable skin structure including a dielectric material layer and flexible metallic material layers bonded to each surface of said dielectric material layer mounted concentrically within said first structure and spaced apart therefrom;
   (c) means for introducing an inflating medium into said first and second structures to effect erection;

(d) said composite layer skin structures comprising a plurality of capacitor sensors for detecting particle penetartion of said first and second spherical structures; and (e) timing means operably connected to said capacitor sensors for determining time lapses between successive penetrations of said sensors.

7. The meteoroid particle detection device of claim 6 including means for measuring the brightness of impact flash of particles penetrating said second spherical structure disposed within said measuring device.

References Cited by the Examiner

UNITED STATES PATENTS

| | | | |
|---|---|---|---|
| 2,996,212 | 8/1961 | O'Sullivan | 244—31 X |
| 3,004,735 | 10/1961 | Kinard | 244—1 X |
| 3,159,029 | 12/1964 | Ruderman | 73—170 |
| 3,184,742 | 5/1965 | Cutler | 244—31 X |

LOUIS R. PRINCE, *Primary Examiner.*

D. M. YASICH, *Assistant Examiner.*